US005876648A

United States Patent [19]

Strasser et al.

[11] Patent Number: 5,876,648

[45] Date of Patent: Mar. 2, 1999

[54] TWO-ROLLER MACHINE AND METHOD FOR PRESSURE TREATMENT OF GRANULAR MATERIAL

[75] Inventors: Siegfried Strasser, Much; Axel Schultz, Cologne, both of Germany

[73] Assignee: Deutz Aktiengesellschaft, Cologne, Germany

[21] Appl. No.: 911,523

[22] Filed: Aug. 14, 1997

[30] Foreign Application Priority Data

Aug. 16, 1996 [DE] Germany ........................ 196 32 976.0

[51] Int. Cl.[6] ........................................ B29C 43/08

[52] U.S. Cl. .......................... 264/115; 264/123; 425/197; 425/363

[58] Field of Search .................................... 264/109, 123, 264/115; 425/197, 363

[56] References Cited

U.S. PATENT DOCUMENTS

| | | | |
|---|---|---|---|
| 147,665 | 2/1874 | Loiseau | 425/363 |
| 2,615,404 | 10/1952 | Crosland et al. | 425/363 |
| 2,729,855 | 1/1956 | Titus et al. | 264/109 |
| 2,922,189 | 1/1960 | Perks | 425/363 |
| 3,242,530 | 3/1966 | Hirsch et al. | 425/363 |
| 3,553,775 | 1/1971 | Decker | 425/363 |
| 3,674,397 | 7/1972 | Harris | 425/363 |
| 3,838,958 | 10/1974 | Fuller et al. | 425/363 |
| 4,357,287 | 11/1982 | Schonert | 264/109 |
| 4,436,682 | 3/1984 | Knopp | 264/123 |
| 5,462,425 | 10/1995 | Kuss et al. | 425/197 |

FOREIGN PATENT DOCUMENTS

| | | |
|---|---|---|
| 0 278 858 | 8/1988 | European Pat. Off. . |
| 27 08 053 | 9/1978 | Germany . |

*Primary Examiner*—Mary Lynn Theisen
*Attorney, Agent, or Firm*—Hill & Simpson

[57] ABSTRACT

In order to assure that an adequately small delivery granulation is offered to the nip of a two-roller machine, preferably a high-pressure roller press for interparticle crushing, namely for an optimum draw-in of the granular material, it is inventively proposed that a sieve means to be arranged in the product delivery shaft of the two-roller machine and that the oversized sieve particles be comminuted with a crushing roller that is likewise arranged in the product delivery shaft and that the comminuted particles then be presented to the high pressure nip for further interparticle crushing.

10 Claims, 1 Drawing Sheet

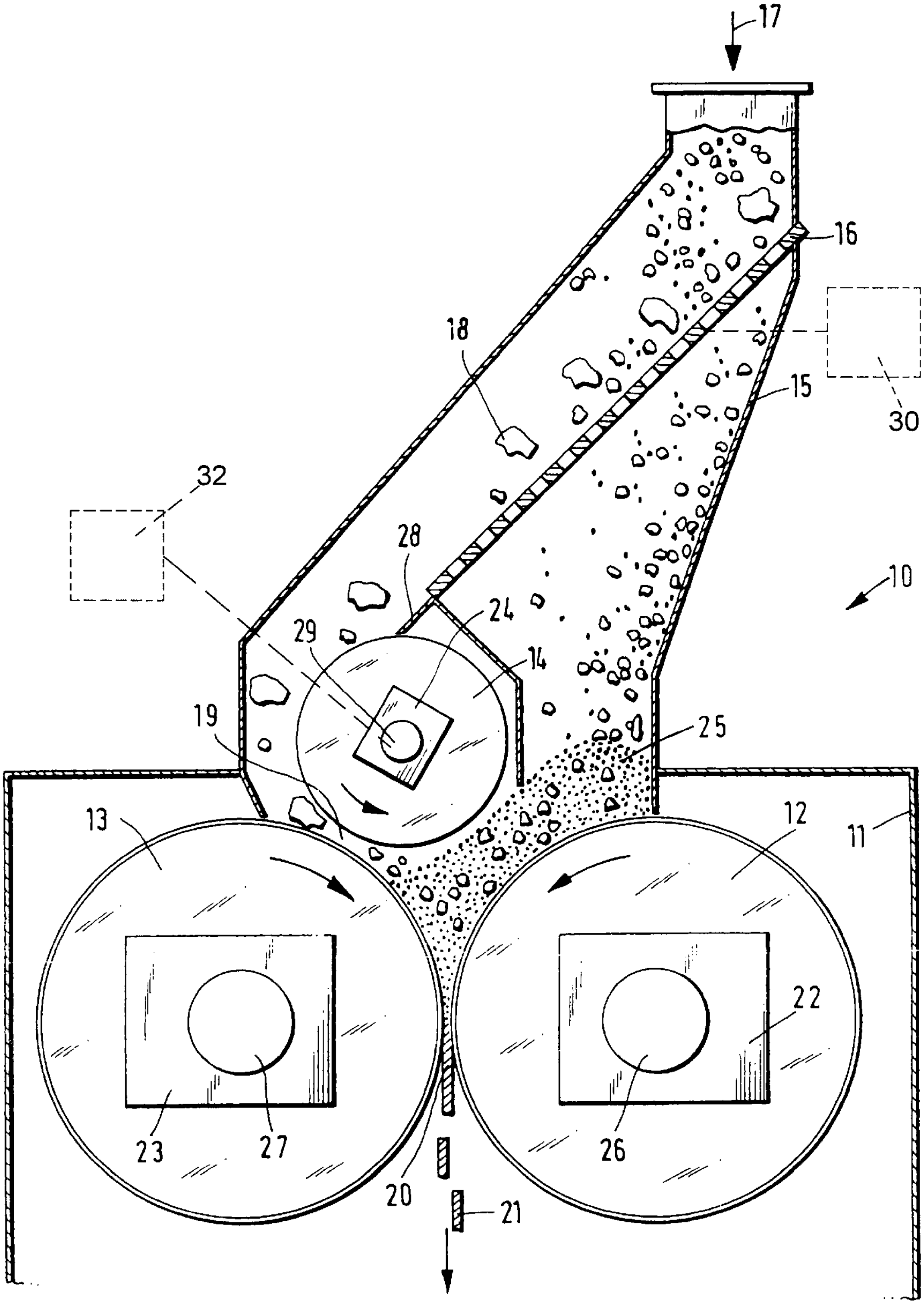
17
16
18
15
30
32
28
24
10
29
14
19
25
13
12
11
22
23
27
26
20
21

TWO-ROLLER MACHINE AND METHOD FOR PRESSURE TREATMENT OF GRANULAR MATERIAL

BACKGROUND OF THE INVENTION

The invention is directed to a two-roller machine, particularly a high-pressure roller press for pressure treatment of granular material with two oppositely rotatable rollers separated from one another by a nip and between which the granular material is drawn in and subjected to an interparticle comminution, having a product delivery shaft above the nip.

The invention is also directed to a method for the pressure comminution of granular material with such a two-roller machine.

During operation of the high-pressure roller press for compression or, respectively, for pressure comminution of granular material, the bulk material supplied to the nip is seized by the oppositely rotating rollers and is drawn into the nip by friction (friction within the bulk material and friction between the bulk material and the roller surface). The individual particles of the bulk material that is drawn in are thereby mutually crushed in a product bed, i.e. in a material fill compressed between the two roller surfaces given application of high pressure, so that one thereby refers to interparticle crushing (German Letters Patent 27 08 053 and corresponding U.S. Pat. No. 4,357,287). Agglomerates of comminuted bulk material are the product of this pressure treatment and can be subsequently loosened with little mechanical outlay.

A correspondingly high friction for the occurrence of a high-pressure interparticle comminution is dependent on the nature of the material to be comminuted (brittleness, grain structure, grain shape) and on the embodiment of the roller surface. In particular, the maximum grain size that can still be drawn in by the rollers is limited. Given roller surfaces implemented with high abrasion resistance, thus, the maximum charging grain should be smaller than the nip. Given normal execution of the roller surface, the delivered grain size should not exceed twice the value of the nip.

In order to meet this demand, EP-A-O 278 858 proposes that a crushing roller in which the entire bulk material is pre-comminuted precedes the high-pressure roller press. What is disadvantageous about this procedure is that all of the bulk material, i.e. the particles with adequately small grain size as well, are conducted through the crushing roll, as a result whereof the energy consumption of the overall process is unnecessarily increased and, further, that the machine outlay for the high-pressure comminution increases with the crushing roll as an independent machine.

SUMMARY OF THE INVENTION

Given pressure comminution of granular material in the nip of a roller machine, particularly a two-roller press, an object of the invention is to assure that the nip is always supplied only with a bulk material that is free of undesirably large individual particles.

This object is achieved in terms of apparatus described herein and is achieved in terms of the method described herein.

As a result of the measure of the invention of arranging a sieve means in the product delivery shaft of the two-roller machine, particularly of the high-pressure roller press, the sieve overflow thereof being comminuted in the crushing nip of a crushing roller that forms this crushing nip with one of the two rollers of the two-roller machine to a grain size that can be unproblemmatically drawn in by the two-roller machine, a bulk material that is optimum for the pressure treatment is presented to the two-roller machine.

The two-roller machine fashioned in this inventive way represents a compact unit in which a pre-sieving, a partial pre-comminution and, finally, the desired interparticle comminution ensue with minimum capital and operating costs. Since the sieving and the pre-comminution are implemented in the product delivery shaft, a separate charging means and a separate discharge means are not required for the two method steps, nor is an otherwise complicated dedusting, since these method steps are carried out in the product delivery shaft that is closed from the outside.

According to the invention, the sieve means can be composed of a vibration sieve, of a sieve chute or of a static sieve grate. Which sieve means is employed is dependent on the object that is to be solved by the sieve means due to the nature of the granular material. What is important is that the sieve fines exhibit a grain size that maximally amounts only to two through 2.5 times the opening size of the nip. In specific instances, for example given roller surfaces implemented with high abrasion resistance, the sieve means should be in a position to produce a sieve underflow whose maximum grain size is equal to or smaller than the nip width of the two-roller machine.

The sieved material that the sieve means separates out from the remaining granular material as oversize particles is seized within the product deliver shaft by the crushing nip between the crushing roller and one of the rollers of the two-roller machine and is comminuted to the grain size that corresponds to the sieve width of the sieve means and that is required for unproblemmatical delivery to the two-roller machine.

To this end, the crushing roller is driven by a separate driver to a circumferential speed that corresponds to the circumferential speed of the roller of the two-roller machine or, on the other hand, the drive of the crushing roller ensues by frictional connection via the oversized particles to be comminuted that are located in the crushing nip with the roller of the two-roller machine, i.e. the crushing roller then works as a drag roll and only turns when oversized particles to be comminuted are directed into the crushing nip.

Dependent on the amount of oversized particle to be comminuted, the width of the crushing roller can correspond to the width of the roller of the two-roller machine. However, it can also be executed significantly narrower, so that the width then, for example, only corresponds to $\frac{1}{4}^{th}$ of the roller width.

BRIEF DESCRIPTION OF THE DRAWINGS

Further details, advantages and features of the invention derive from the following explanations of an exemplary embodiment shown in a figure of the drawing.

The figure of the drawing shows the vertical section through a two-roller machine for the pressure comminution of granular material in accordance with the principles of the present invention.

DETAILED DESCRIPTION OF THE PREFERRED EMBODIMENTS

The schematic figure of the drawing shows a two-roller machine or, respectively, high-pressure roller press 10 for the pressure treatment (interparticle crushing) of granular material comprising two oppositely rotatable rollers 12, 13

(the drives are not shown) that are seated in a machine frame 11 via their shafts 26, 27 and bearings 22, 23. Above the two rollers 12, 13, the machine frame 11 carries a product delivery shaft or chute 15 in which the granular material 17 to be comminuted is delivered at the top via an opening.

A sieve means 16 by which the delivered material 17 is sieved and separated into oversized sieve particles 18 and into sieve underflow 25 is arranged within the product delivery shaft 15. Whereas the sieve underflow or fines 25 drops directly down into a nip 20 of the two-roller machine, the oversized sieve particles slide via the sieve means 16 and via a baffle 28 into a crushing nip 19 that is formed by the roller 13 and by the crushing roller 14 and is comminuted thereat to the desired grain size-it corresponds to the mesh width of the sieve 16. The preselected gap width of the sieve means 16 should be in the range of about 0.8 to 2.5 times the width of the nip 20. The width of the crushing nip 19 should be set to a size in the range of about 0.8 to 2.5 times the width of the nip 20.

The crushing roller 14 with its bearing 24 and its shaft 29 is likewise seated in the machine frame 11, namely such that it can be displaced obliquely up or obliquely down in order to thus be able to vary the size of the crushing nip 19 and to be adapted to the respective requirements.

Since the crushing procedure itself is not a high-pressure or, respectively, interparticle crushing, the bearing 24 is correspondingly dimensioned for the low bearing forces required, and an optional drive 32 of the crushing roller is also designed correspondingly small unless, as proposed in an advantageous development of the invention, the crushing roller 14 is driven by the roller 13 as drag roller and the drive 32 is not provided.

The oversized sieve particles 18 comminuted in the crushing nip 19 now likewise drop into the nip 20 of the two-roller machine 10 wherein the comminuted material is now subjected to a high-pressure stressing, i.e. to an interparticle comminution, in common with the sieved sieve underflow 25 and is discharged downward from the nip 20 in the form of agglomerates 21.

The illustrated example represents only one possible embodiment of the product delivery shaft and one possible arrangement of the machine parts arranged in the product delivery shaft, namely, the sieve means and crushing roller, that, however, can be correspondingly modified dependent on the properties of the material and demands made of the sieving and crushing process.

For example, an optional vibration device 30 may be attached to the sieve means 16 to cause the sieve to vibrate. The sieve means 16 can also be formed as a sieve chute.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A two-roller machine, particularly high-pressure roller press, for pressure treatment of granular material comprising two oppositely rotatable rollers separated from one another by a nip of a given width between which the granular material is drawn in and subjected to an interparticle crushing and comprising a product delivery shaft above the nip, comprising:

a sieve means arranged in the product delivery shaft that sieves the granular material before the entry thereof into the nip, whereby the preselected gap width of the sieve is in the range of about 0.8 to 2.5 times the width of the nip; and a crushing roller arranged in the product delivery shaft below the sieve means and laterally above a roller, said crushing roller forming a crushing nip with the roller.

2. A two-roller machine according to claim 1, wherein the sieve means is a vibration sieve.

3. A two-roller machine according to claim 1, wherein the sieve means is a sieve chute.

4. A two-roller machine according to claim 1, wherein the sieve means is a static sieve grate.

5. A two-roller machine according to claim 1, wherein the width of the crushing roller corresponds to the width of the roller.

6. A two-roller machine according to claim 1, wherein the width of the crushing roller is smaller than the width of the roller.

7. A two-roller machine according to claim 1, wherein the drive of the crushing roller ensues via oversized sieve particles situated in the crushing nip that produce a frictional connection, ensuing with the roller.

8. A two-roller machine according to claim 1, wherein the crushing roller comprises a separate drive.

9. A method for the pressure treatment of granular material formed of various sized particles, in a nip of a two-pressure roller machine, comprising the steps of:

arranging the two pressure rollers so as to have a nip width that will cause high pressure interparticle crushing of said granular material supplied to said nip;

delivering said granular material to said nip by means of a product delivery shaft;

arranging a sieve with openings therethrough in said shaft;

sizing said openings to a size in a range of about 0.8 to 2.5 times said width of said nip;

separating out oversize particles of said granular material from fines of said material at said sieve;

providing a third, crushing roller which has a crushing nip formed with one of said two pressure rollers;

directing said oversize particles to said crushing nip;

comminuting said oversize particles in said crushing nip;

directing said comminuted particle s and said fines passed by said sieve, in common, to said nip between said two pressure rollers for pressure treatment therebetween.

10. A met hod according to claim 9, wherein said oversized particles are pre-comminuted by said crushing roller by setting a width of said crushing nip to a size in a range of about 0.8 times through 2.5 times said width of said nip between said two pressure rollers.

* * * * *